(12) United States Patent
Singh et al.

(10) Patent No.: US 8,656,069 B2
(45) Date of Patent: *Feb. 18, 2014

(54) PERIPHERAL INTERFACE ALERT MESSAGE FOR DOWNSTREAM DEVICE

(71) Applicant: Micron Technology, Inc., Boise, ID (US)

(72) Inventors: Ajai Singh, Folsom, CA (US); David Puffer, Tempe, AZ (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,161

(22) Filed: Dec. 27, 2012

(65) Prior Publication Data

US 2013/0151887 A1   Jun. 13, 2013

Related U.S. Application Data (63) Continuation of application No. 13/111,673, filed on May 19, 2011, now Pat. No. 8,346,992, which is a continuation of application No. 11/156,838, filed on Jun. 20, 2005, now Pat. No. 7,970,958.

(51) Int. Cl.
*G06F 3/00* (2006.01)

(52) U.S. Cl.
USPC ........... 710/19; 710/18; 710/55; 709/224; 714/2; 714/48; 714/49; 714/50; 714/746; 714/799

(58) Field of Classification Search
None
See application file for complete search history.

(56) References Cited

U.S. PATENT DOCUMENTS

| | | |
|---|---|---|
| 3,749,845 A | 7/1973 | Fraser |
| RE31,319 E | 7/1983 | Fraser |
| 5,163,151 A | 11/1992 | Bronikowski et al. |
| 5,673,252 A | 9/1997 | Johnson et al. |
| 5,961,605 A | 10/1999 | Deng et al. |
| 6,181,704 B1 | 1/2001 | Drottar et al. |
| 6,272,550 B1 | 8/2001 | Deng et al. |
| 6,662,319 B1 | 12/2003 | Webb, Jr. et al. |
| 6,674,751 B1 | 1/2004 | Dittmar |
| 6,744,765 B1 | 6/2004 | Dearth et al. |
| 6,774,765 B1 | 8/2004 | Goodwin, III |
| 7,100,096 B2 | 8/2006 | Webb, Jr. et al. |
| 7,370,243 B1 | 5/2008 | Grohoski et al. |
| 7,970,958 B2 | 6/2011 | Singh |
| 8,286,027 B2 * | 10/2012 | Watkins et al. ........... 714/5.1 |
| 2002/0142720 A1 | 10/2002 | Russell et al. |
| 2004/0059978 A1 | 3/2004 | Subrahmanya |
| 2004/0073658 A1 | 4/2004 | Oran et al. |

(Continued)

OTHER PUBLICATIONS

"PCI Express Base Specification Revision 1.0", (Apr. 29, 2002), 338-342.

(Continued)

*Primary Examiner* — Steven Snyder
(74) *Attorney, Agent, or Firm* — Scwegman, Lundberg & Woessner, P.A.

(57) ABSTRACT

According to some embodiments, a message generated by a downstream device is received at upstream device. The message may, for example, be received via a peripheral interface and may not require a response. It may then be determined that an error is associated with the message, and an alert message may be sent from the upstream device to the downstream device via the peripheral interface.

18 Claims, 7 Drawing Sheets

(56) References Cited

U.S. PATENT DOCUMENTS

| | | |
|---|---|---|
| 2005/0034045 A1 | 2/2005 | Lueck et al. |
| 2005/0120163 A1 | 6/2005 | Chou et al. |
| 2005/0207726 A1 | 9/2005 | Chen |
| 2006/0013155 A1 | 1/2006 | Spaete, Jr. |
| 2006/0230210 A1 | 10/2006 | Stanton |
| 2006/0239095 A1 | 10/2006 | Shi et al. |
| 2006/0282603 A1 | 12/2006 | Onufryk et al. |
| 2006/0282639 A1 | 12/2006 | Liu |
| 2006/0288098 A1 | 12/2006 | Singh et al. |
| 2007/0028152 A1 | 2/2007 | Mishra et al. |
| 2008/0155356 A1 | 6/2008 | Boskovic et al. |
| 2011/0225469 A1 | 9/2011 | Singh et al. |
| 2013/0031419 A1* | 1/2013 | Haverkamp et al. ............ 714/45 |
| 2013/0031420 A1* | 1/2013 | Haverkamp et al. ............ 714/45 |
| 2013/0055030 A1* | 2/2013 | Hopkins et al. ................. 714/39 |

OTHER PUBLICATIONS

Ajanovic, Jasmin, "PCI Express Architecture Advanced Protocols & Features", PCI-SIG, (2003).

"U.S. Appl. No. 11/156,838, Advisory Action mailed Mar. 10, 2010", 3 pgs.

"U.S. Appl. No. 11/156,838, Advisory Action mailed Apr. 5, 2010", 13 pgs.

"U.S. Appl. No. 11/156,838, Final Office Action mailed Oct. 7, 2008", 17 pgs.

"U.S. Appl. No. 11/156,838, Final Office Action mailed Dec. 4, 2009", 27 pgs.

"U.S. Appl. No. 11/156,838, Non Final Office Action mailed Apr. 16, 2010", 28 pgs.

"U.S. Appl. No. 11/156,838, Non Final Office Action mailed May 21, 2008", 17 pgs.

"U.S. Appl. No. 11/156,838, Non Final Office Action mailed May 22, 2009", 24 pgs.

"U.S. Appl. No. 11/156,838, Non Final Office Action mailed Oct. 15, 2007", 13 pgs.

"U.S. Appl. No. 11/156,838, Non Final Office Action mailed Oct. 21, 2010", 25 pgs.

"U.S. Appl. No. 11/156,838, Response filed Jan. 11, 2008 to Non Final Office Action mailed Oct. 15, 2007", 10 pgs.

"U.S. Appl. No. 11/156,838, Response filed Jan. 11, 2011 to Non Final Office Action mailed Oct. 21, 2010", 14 pgs.

"U.S. Appl. No. 11/156,838, Response filed Mar. 3, 2009 to Final Office Action mailed Dec. 4, 2009", 15 pgs.

"U.S. Appl. No. 11/156,838, Response filed Mar. 9, 2009 to Final Office Action mailed Oct. 7, 2008", 11 pgs.

"U.S. Appl. No. 11/156,838, Response filed Jun. 11, 2008 to Non Final Office Action mailed May 21, 2008", 11 pgs.

"U.S. Appl. No. 11/156,838, Response filed Jul. 14, 2010 to Non Final Office Action mailed Apr. 16, 2010", 12 pgs.

"U.S. Appl. No. 11/156,838, Response filed Aug. 24, 2009 to Non Final Office Action mailed May 22, 2009", 11 pgs.

"U.S. Appl. No. 13/111,673, Advisory Action mailed Jun. 4, 2012", 3 pgs.

"U.S. Appl. No. 13/111,673, Examiner Interview Summary mailed Jul. 24, 2012", 2 pgs.

"U.S. Appl. No. 13/111,673, Final Office Action mailed Mar. 20, 2012", 21 pgs.

"U.S. Appl. No. 13/111,673, Non Final Office Action mailed Oct. 18, 2011", 20 pgs.

"U.S. Appl. No. 13/111,673, Notice of Allowance mailed Aug. 29, 2012", 10 pgs.

"U.S. Appl. No. 13/111,673, Response filed Jan. 18, 2012 to Non Final Office Action mailed Oct. 18, 2011", 9 pgs.

"U.S. Appl. No. 13/111,673, Response filed May 21, 2012 to Final Office Action mailed Mar. 20, 2012", 8 pgs.

* cited by examiner

PERIPHERAL INTERFACE ALERT MESSAGE FOR DOWNSTREAM DEVICE

CLAIM OF PRIORITY

The present application is a Continuation of U.S. application Ser. No. 13/111,673, filed May 19, 2011, which is a Continuation Application of U.S. patent application Ser. No. 11/156,838, filed Jun. 20, 2005, now issued as U.S. Pat. No. 7,970,958, all of which are incorporated herein by reference in their entirety.

BACKGROUND

A peripheral interface may be used to exchange information within an apparatus. For example, a Memory Controller Hub (MCH) in a Personal Computer (PC) might use a peripheral interface to exchange information with one or more Ethernet cards, communication devices, and/or storage units. In some cases, an error might occur during an exchange of information. For example, a message transmitted from an Ethernet card to a Memory Controller Hub may be unreadable.

DETAILED DESCRIPTION

Figure 1:
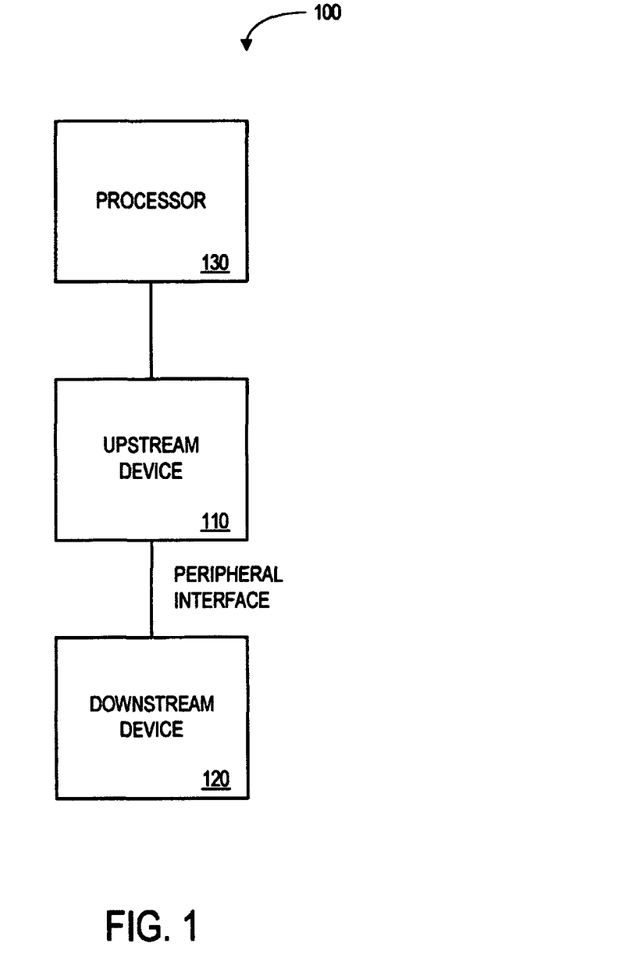
FIG. 1 is a block diagram of an apparatus according to some embodiments.

A peripheral interface may be used to exchange information within an apparatus. For example, FIG. 1 is a block diagram of an apparatus 100 wherein an "upstream" device 110 exchanges information with a "downstream" device 120 via a peripheral interface. As used herein the term "upstream" refers to devices that are closer to a processor 130 in a series of interfaced devices (closer in terms of communication as opposed to being physically closer), and the phrase "downstream" refers to devices that are further away from the processor 130 in the series. The processor might be a central processing unit of any type of architecture, such as an INTEL® PENTIUM IV® processor. Note that embodiments described herein may be associated with an apparatus that has multiple processors. Moreover, it should be appreciated that apparatus 100 may include other, additional, or fewer components than those illustrated in FIG. 1, without departing or altering the scope of the various embodiments herein.

The upstream device 110 might be, for example, a root complex adapted to communicate with the downstream device 120 via the peripheral interface and with the processor 130 via another interface (e.g., a system bus). Examples of upstream devices might include a chipset controller, MCH device, a Graphic MCH (GMCH) device, and a host bridge device. Note that the upstream device 110 might also communicate with other devices (e.g., with one or more memory units).

The downstream device 120 might be, for example, an "end point" or peripheral device. Examples of peripheral devices include an Ethernet card, a video card, a communication device, a storage unit (e.g., a disk controller), and/or a test device.

According to some embodiments, the peripheral interface comprises a relatively high-speed, low-pin-count, point-to-point interface having a multi-drop, parallel bus topology. The peripheral interface might be, for example, a link that operates in accordance with the Peripheral Component Interconnect (PCI) Special Interests Group (SIG) standard entitled "Peripheral Component Interconnect Express® Base Specification" (versions 1.0a or 1.1).

In some cases, an error may occur when the upstream device 110 and the downstream device 120 exchange information via the peripheral interface. For example, a message transmitted from the downstream device 120 to the upstream device 110 may be unreadable (e.g., because of noise on the link). In this case, it may be helpful to notify the downstream device 120 that an error has occurred. For example, the downstream device 120 might perform a re-set or otherwise try to correct the error. As another example, the downstream device 120 might output information about the error (e.g., to help someone who is trying to debug the error).

Figure 2:
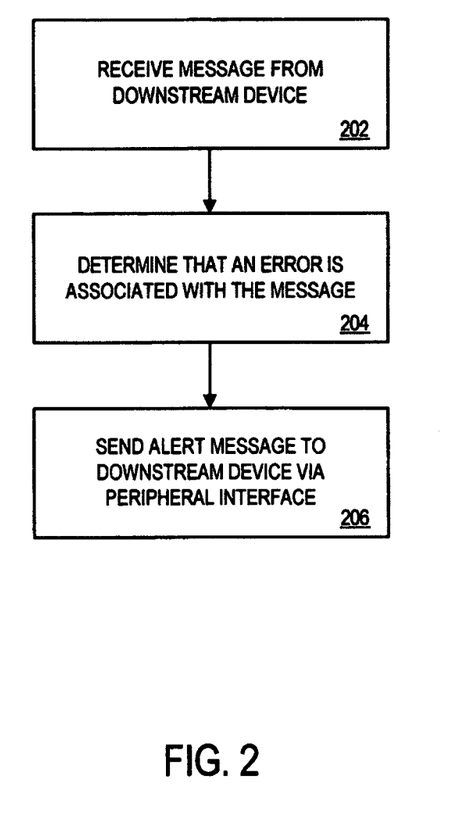
FIG. 2 is a flow diagram illustrating a method according to some embodiments.

FIG. 2 is a flow diagram illustrating a method according to some embodiments. The method may be performed, for example, by the upstream device 110 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, a message is received at an upstream device from a downstream device. For example, a PCI Express message might be received from a peripheral device via a peripheral interface. In some case, the PCI Express message is a "non-posted" message that requires a response. For example, a memory read request transmitted by the downstream device will require that the downstream device eventually receive a response to the request (e.g., including the data that was read). In other cases, a PCI message is a "posted" message that does not require a response. For example, a memory write request transmitted by the downstream device does not require any response. According to some embodiments, the message received at 202 does not require a response (e.g., is a "posted" PCI Express request).

At 204, it is determined that an error is associated with the message. For example, Cyclical Redundancy Check (CRC) data may be examined to determine if the message has been truncated or otherwise corrupted.

At 206, a new type of alert message is sent from the upstream device to the downstream device via the peripheral interface. Note that a message may be received from, or transmitted to, the downstream device via another device (e.g., a switch). Also note that, according to some embodiments, the alert message may be sent to the downstream device in addition to a completion to a non-posted PCI Express request. In this case, the completion might simply indicate that the request was not successful while the alert message may be used to provide additional details about the error.

Figure 3:
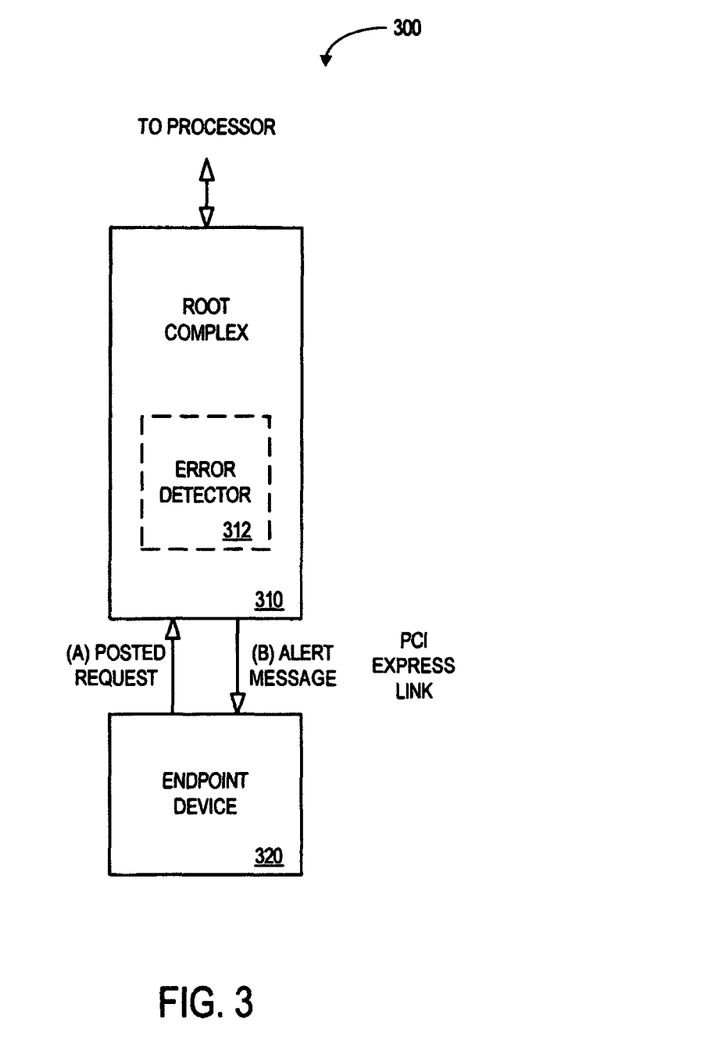
FIG. 3 is an information flow diagram according to some embodiments.

FIG. 3 is an information flow diagram 300 according to some embodiments. In particular, root complex 310 receives a posted request from an endpoint device 320 via a PCI Express link at (A). An error detector 312 at the root complex 310 may then determine that there is a problem with the posted request. The detected error might be, for example, a correctable, non-correctible fatal, or non-correctable non-fatal PCI Express error.

Figure 4:
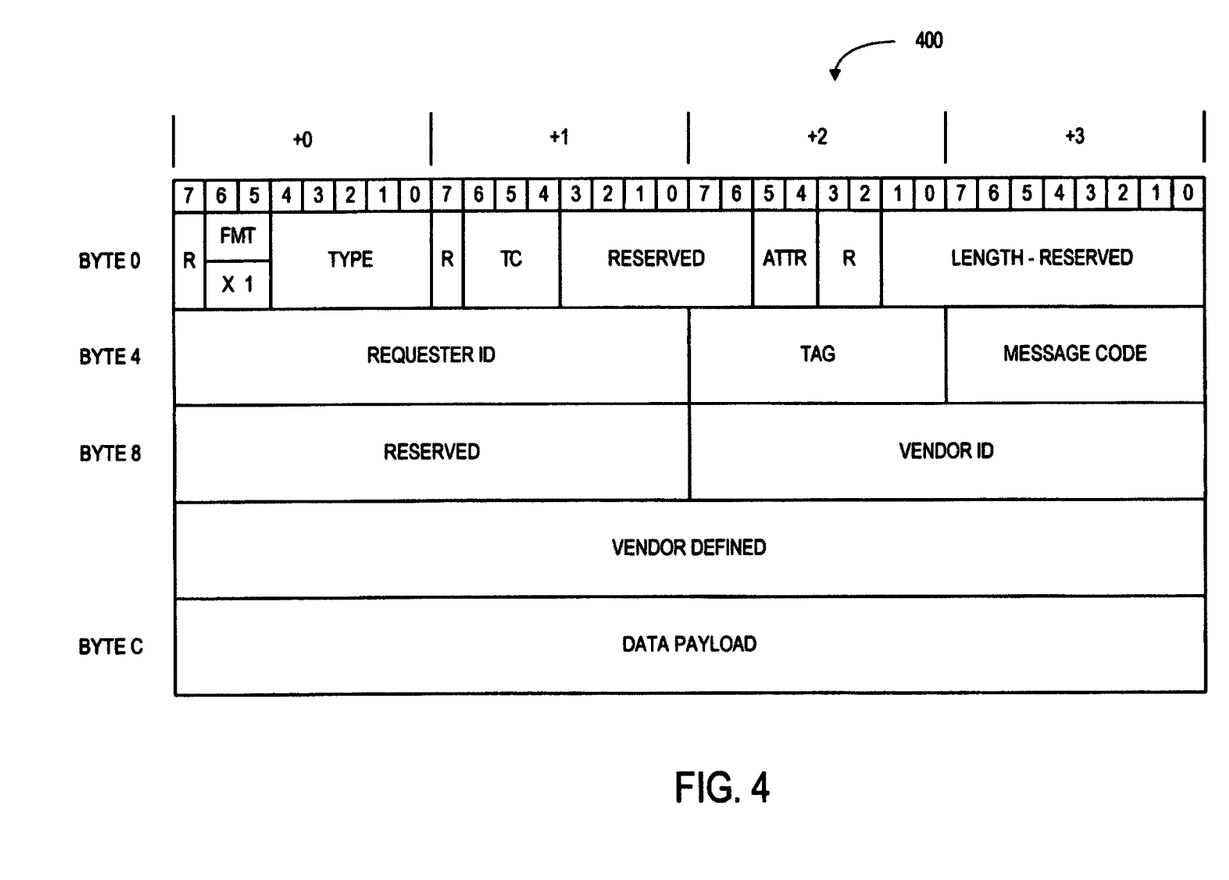
FIG. 4 illustrates an example of an alert message according to some embodiments.

In response to the detected error, the root complex 310 may send an alert message to the endpoint device 320 at (B). The alert message might comprise, for example, an alert Transaction Layer Packet (TLP). FIG. 4 illustrates an example of an alert message 400 according to some embodiments. In particular, the alert message 400 is a Vendor Defined Message Type-1 PCI Express packet. The message 400 might include, for example, format (FMT) information set to "11" and" type (TYP) information set to "10011" indicating that the message is to be broadcast from a root complex. In addition, the message 400 may include traffic class (TC) information set to "0" and attribute (ATTR) information set to "00."

Requestor identifier (ID) information may indicate the downstream device associated with the detected error (e.g., and might include a bus number, a requester device number, and/or a function number). Tag information may be set to zero, and vendor identifier (ID) information might be associated with an entity that has defined the message 400. For example, the vendor ID might be set to "8086h" if the message 400 was defined by INTEL CORPORATION®.

The message 400 may further include vendor defined data, such as a unique identifier (for that particular vendor) indicating that the message 400 is an alert packet. The message 400 may also include a data payload containing information about the error. For example, the data payload might contain the sequence number of the last packet that was successfully processed by the root complex (e.g., prior to the error). The data payload might also contain data from an uncorrectable or correctable status register (e.g., as set forth in the PCI specification).

Note that PCI Express lets an endpoint device drop Vendor Defined Message Type-1 packets if desired. As a result, the alert message 400 should not cause problems for endpoint devices that do not support the message.

Figure 5:
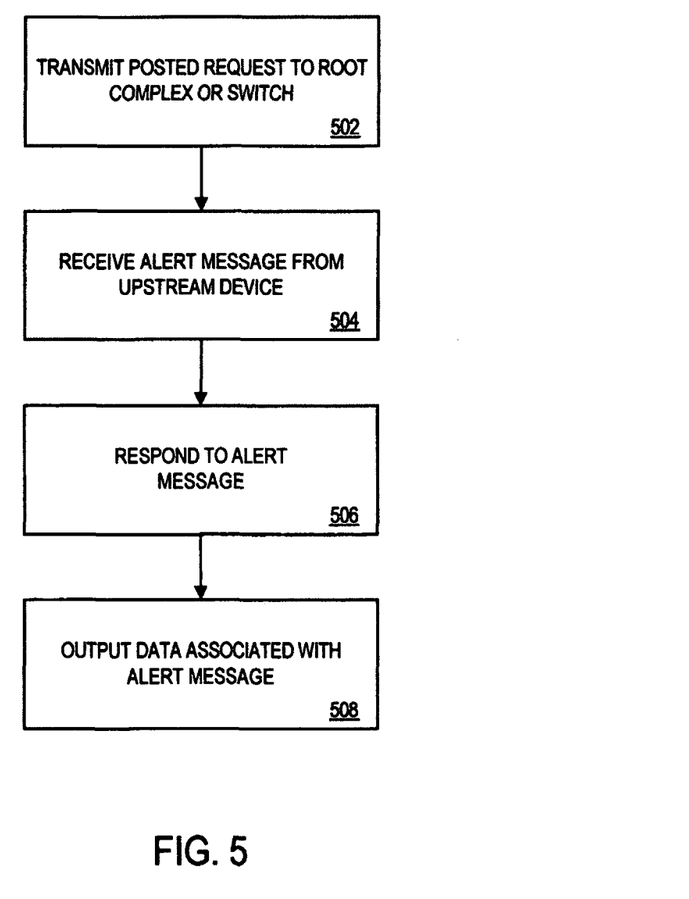
FIG. 5 is a flow diagram illustrating a method according to some embodiments.

FIG. 5 is a flow diagram illustrating a method according to some embodiments. The method might be performed, for example, by the downstream device 120 of FIG. 1 or the endpoint device 320 of FIG. 3. At 502, a posted request is transmitted upstream to a root complex or switch. The posted request might comprise, for example, a memory write request.

At 504, an alert message is received from an upstream device. For example, a PCI Express Vendor Defined Message Type-1 packet might be received with a vendor ID and vendor defined data indicating that the packet is an alert packet. The downstream device might try to respond to the alert message at 506. For example, the downstream device might re-set itself or otherwise attempt to recover from a bad state.

At 508, the downstream device might log and/or output data associated with the alert message. For example, the downstream device might output data associated with the last packet successfully processed by the root complex along with data from an uncorrectable error status register. Note that someone trying to debug an error might be interested in determining when the error occurred and/or other details about the error. Although a logic analyzer could be coupled to various interfaces (e.g., a system bus) to determine this type of information, such an approach can be difficult and time consuming (especially when the apparatus is associated with a mobile platform). According to some embodiments, the downstream device can directly output information associated with an error to facilitate a debugging process.

Figure 6:
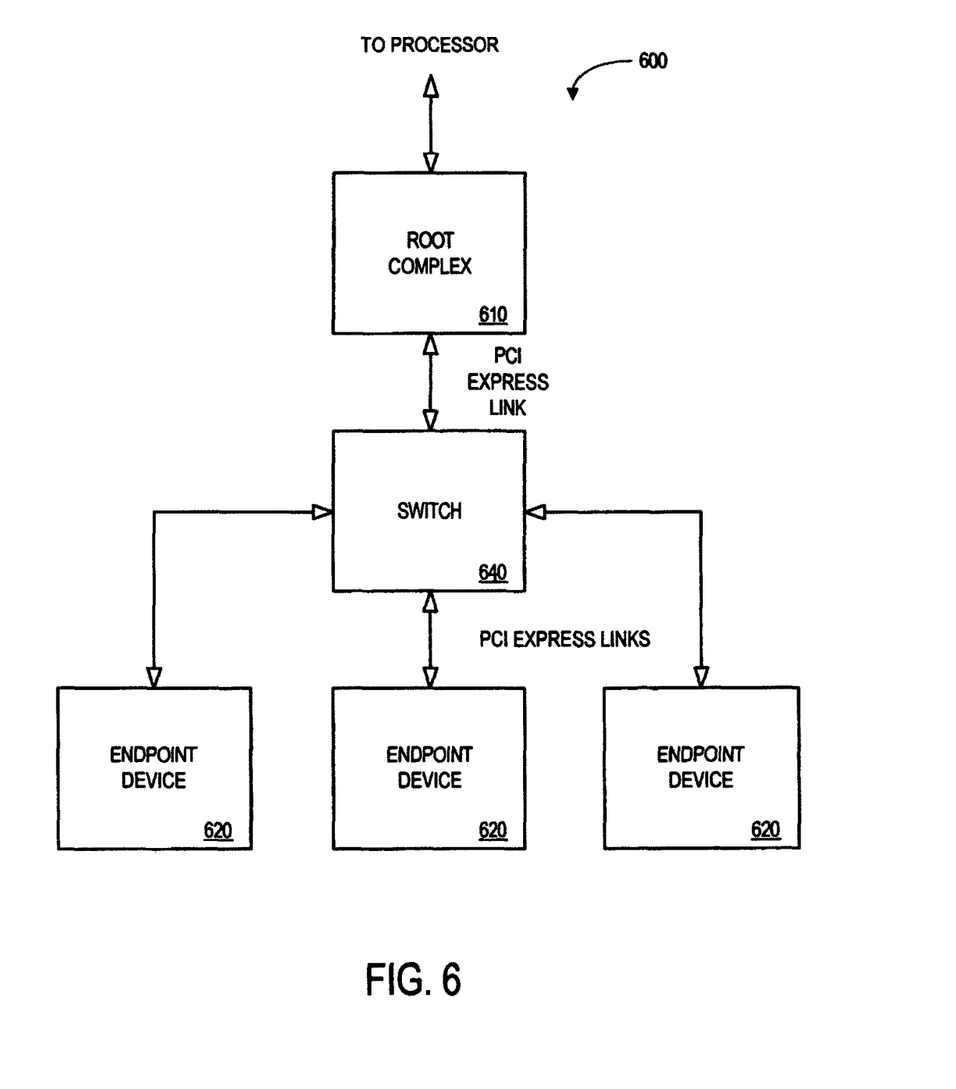
FIG. 6 is a block diagram of an apparatus according to some embodiments.

Note that an alert message might be transmitted downstream (i) from a device other than a root complex, and/or (ii) to a device other than an endpoint. For example, FIG. 6 is a block diagram of an apparatus 600 according to some embodiments. In this case, a switch 640 is coupled to a root complex 610 and a number of different endpoint devices 620 via a plurality of PCI Express links. In this case, an endpoint device 620 might send a posted request to the switch 640, which in turn forwards the request to the root complex 610. According to some embodiments, the switch 640 may detect an error and send an alert message to the appropriate endpoint device 620. According to other embodiments, the root complex 610 will detect an error and send an alert message to the switch 640 (which in turn may forward the alert message to the appropriate endpoint device 620).

Figure 7:
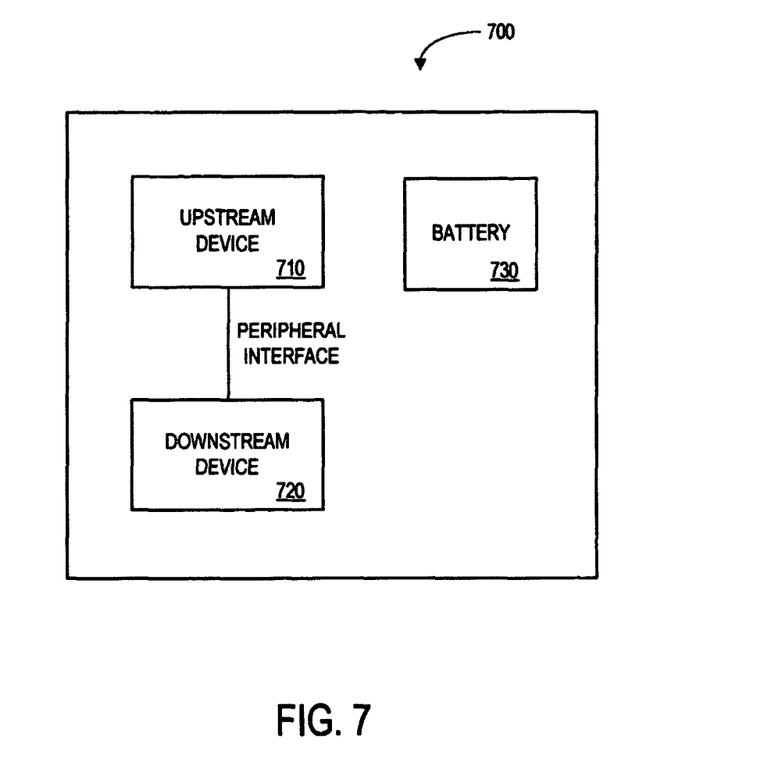
FIG. 7 is a block diagram of a system according to some embodiments.

FIG. 7 is a block diagram of a system 700 according to some embodiments. The system 700 might be associated with, for example, a PC, a mobile computer, a server, a wireless device, a game device, or a media device (e.g., a Digital Video Recorder (DVR) or set-top box).

The system 700 may include an upstream device 710 and a downstream device 720 in accordance with any of the embodiments described herein. For example, the upstream device 710 may be an interface device (e.g., a root complex or switch) adapted to detect an error associated with a request, and to transmit an alert message to the downstream device 720 via a peripheral interface. The downstream device 720 might comprise, for example, an endpoint device (e.g., a peripheral) adapted to receive the alert message. According to some embodiments, the system 700 further includes a battery 730 (e.g., to provide power to a processor and/or to provide power when the system 700 is turned off).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to a PCI Express interface, note that embodiments may be associated with other types of interfaces, including other types of PCI interfaces and non-PCI interfaces. Moreover, although a particular alert message format was described with respect to FIG. 4, other formats may be used (e.g., additional information about an error could be provided in an alert message).

The several embodiments described herein are solely for the purpose of illustration. Persons skilled in the art will recognize from this description other embodiments may be practiced with modifications and alterations limited only by the claims.

What is claimed is:
1. A method comprising:
receiving an upstream message generated by a downstream device via a peripheral interface of an upstream device; and
sending from the upstream device to the downstream device, via the peripheral interface, an alert message, wherein the alert message indicates that the received upstream message is corrupted by an error, and wherein the alert message comprises a Peripheral Component Interconnect (PCI) Express vendor-defined message packet associated with a peripheral device, and information associated with an uncorrectable error status register, wherein the downstream device is operable to generate debug information in response to the alert message, and to directly output the debug information associated with the error.

2. The method of claim 1, wherein the upstream device is operable to send a completion message, in addition to the alert message, to indicate that a request from the downstream device was not successful.

3. The method of claim 1, wherein the alert message further comprises a sequence number of the last packet to have been successfully processed by the upstream device prior to the error.

4. The method of claim 1, wherein the error comprises at least one of a correctable PCI Express error, a non-correctible fatal PCI Express error, or a non-correctable non-fatal PCI Express error.

5. A system comprising:
an endpoint device to transmit a request via a peripheral interface associated with a Peripheral Component Interconnect (PCI) Express bus, the endpoint device being operable to:
generate debug information associated with an error in response to receiving an alert message transmitted to the endpoint via the peripheral interface; and
directly output the debug information for debugging the error, wherein the alert message comprises a PCI Express vendor-defined message packet associated with a peripheral device, the PCI Express vendor-defined message packet including information associated with an uncorrectable error status register, and a vendor-defined message.

6. The system of claim 5, wherein the alert message further comprises requester identifier information including at least one of a bus number, a requester device number, or a function number indicative of the endpoint device associated with the alert message determined to be corrupted.

7. The system of claim 5, wherein the alert message also comprises a sequence number of the last packet to have been successfully processed by a switch prior to the error.

8. The system of claim 5, wherein the system includes at least one of a personal computer, a mobile computer, a server, a wireless device, a game device, or a media device.

9. The system of claim 5, further comprising a switch that is operable to:
receive the request from the endpoint device,
detect whether the request is corrupted by an error, and
transmit an alert message to the endpoint via the peripheral interface.

10. The system of claim 9, wherein the switch is operable to send a completion message to indicate that the request was not successful in addition to sending the alert message to the endpoint device.

11. The system of claim 9, wherein the switch is coupled to a processor via a second interface separate from the peripheral interface.

12. An apparatus comprising:
an input port to receive an alert message from an upstream device, via an interface associated with a Peripheral Component Interconnect (PCI) Express bus, in response to the upstream device detecting whether a request transmitted to the upstream device is corrupted, wherein the alert message comprises a PCI Express vendor-defined message packet associated with a peripheral device, and information associated with an uncorrectable error status register; and
first logic operable to generate debug information in response to receiving the alert message by a downstream device.

13. The apparatus of claim 12, further comprising:
an output port to transmit the request to the upstream device, wherein the request does not require a response, and wherein the apparatus is to be coupled to the upstream device via the interface.

14. The apparatus of claim 12, further comprising:
second logic operable to directly output the debug information associated with the error.

15. A method comprising:
transmitting an upstream message generated by a downstream device to a peripheral interface of an upstream device;
receiving an alert message transmitted by the upstream device via the peripheral interface, wherein the alert message indicates that the transmitted upstream message is corrupted by an error, and wherein the alert message comprises a Peripheral Component Interconnect (PCI) Express vendor-defined message packet associated with a peripheral device, and information associated with an uncorrectable error status register; and
generating debug information in response to receiving the alert message by the downstream device.

16. The method of claim 15, further comprising directly outputting, by the downstream device, the debug information associated with the error.

17. The method of claim 15, further comprising receiving a completion message transmitted from the upstream device to indicate that the upstream message was not successful in addition to receiving the alert message.

18. The method of claim 15, wherein the upstream device includes at least one of a root complex, a memory controller hub, a graphics memory controller hub, a chipset, or a switch.

* * * * *

UNITED STATES PATENT AND TRADEMARK OFFICE
CERTIFICATE OF CORRECTION

| | | |
|---|---|---|
| PATENT NO. | : 8,656,069 B2 | Page 1 of 1 |
| APPLICATION NO. | : 13/728161 | |
| DATED | : February 18, 2014 | |
| INVENTOR(S) | : Ajai Singh et al. | |

It is certified that error appears in the above-identified patent and that said Letters Patent is hereby corrected as shown below:

On the title page, in item (74), in column 2, line 1, delete "Scwegman," and insert -- Schwegman, --, therefor.

In the Claims

In column 5, line 19, in Claim 4, delete "non-correctible" and insert -- non-correctable --, therefor.

Signed and Sealed this
Twenty-second Day of April, 2014

Michelle K. Lee
*Deputy Director of the United States Patent and Trademark Office*